United States Patent [19]

Davis et al.

[11] Patent Number: 4,693,098
[45] Date of Patent: Sep. 15, 1987

[54] NON-KEY LOCKING CABLE LOCK

[76] Inventors: Jeffrey L. Davis, 13235 SW. 121st, Tigard, Oreg. 97223; Daniel S. Evans, 1327 Tamarisk Dr., West Linn, Oreg. 97068; Lawrence P. Hall, 2601 SE. 170th St., Portland, Oreg. 97236

[21] Appl. No.: 945,000

[22] Filed: Dec. 22, 1986

[51] Int. Cl.⁴ .............................................. B62H 5/00
[52] U.S. Cl. ........................................... 70/233; 70/18
[58] Field of Search ...................... 70/233, 18, 30, 49, 70/234, 235, 236

[56] References Cited

U.S. PATENT DOCUMENTS 1,991,825  2/1935  Strickland ......................... 70/233
3,910,602  10/1975  Lindner ............................ 70/233

FOREIGN PATENT DOCUMENTS 3046810  7/1982  Fed. Rep. of Germany ........ 70/233
7806670  12/1979  Netherlands ......................... 70/233

Primary Examiner—Robert L. Wolfe
Attorney, Agent, or Firm—Jerome J. Norris

[57] ABSTRACT

A cable-lock device for tubular frame vehicles having a swaged end cable with identical halves of a phallic head as a plug for insertion into a lock member, comprising a sliding latch plate with a semi-circular opening which aligns with a groove in the phallic head to form a lock.

6 Claims, 6 Drawing Figures

NON-KEY LOCKING CABLE LOCK

BACKGROUND OF THE INVENTION

1. Field of the Invention

The invention generally pertains to locking systems for securing vehicles such as bicycles, motor scooters, and the like, to stationary structures, in order to prevent theft when the vehicles are left unattended by the rider.

In particular, the invention pertains to tubular or chamber storageable flexible cable-type locking systems for securing bicycles, motor scooters, and like vehicles, to stationary structures, in order to prevent theft of the vehicle.

2. Brief Description of the Prior Art

Older types of locks for securing bicycles have been padlocks which have an elongated clasp which interlocks the spokes of the bicycle wheel with portions of the fame of the bicycle; however, this type of locking system could not deter theft from one who was disposed to lifting the bicycle into a vehicle to carry it away.

More recent types of locks for securing bicycles are cable-type locks which are anchored to a part of the frame of the bicycle and have a cable of adequate length to be secured around a stationary structure such as a tree, post or the support member of a bicycle rack at the location where the bicycle is to be left. The locks so provided are elongated flexible cables which carry locking elements on its opposite ends, and which can be extended through the frame and around a stationary structure, and the ends locked together to secure the bicycle to the structure.

In cable locking systems having the cable secured to some tubular or chamber part of the bicycle frame, such as the handlebar, it is necessary to use a key during the procedure of locking-up the bicycle to a stationary structure, and it is also necessary to use a key for unlocking the bicycle. Further, the rider must also use a key to simply remove the cable from a tubular structure of the bicycle frame, such as the handlebar.

These cable locking systems, which require frequent usages of a key make it more difficult and time consuming to attach and remove the bicycle from a stationary structure.

SUMMARY OF THE INVENTION

It is a general object of the invention to provide a simpler cable vehicle locking system or device that allows a vehicle such as a bicycle to be more quickly secured to a stationary structure.

It is a further object of the invention to provide a cable vehicle locking system which does not require a key, during the procedure of locking a vehicle, such as a bicycle, to a stationary structure.

A yet further object of the invention is to provide a cable vehicle locking system which does not require the use of a key to remove the cable from a tubular part of the bicycle frame, such as the handlebar, prior to the procedure of locking-up the vehicle to a stationary structure without the use of a key.

These and other objects and advantages of the invention will become more apparent in the detailed description and accompanying drawings.

BRIEF DESCRIPTION OF THE DRAWINGS

A preferred, but non-limiting, embodiment is illustrated in the drawings, where.

DETAILED DESCRIPTION OF THE INVENTION

Figure 1A:
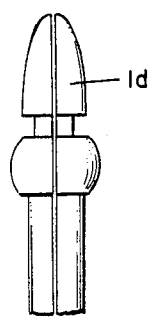
FIG. 1 is a view of a phallic-headed cable of two equal lengths swaged together at one end to form a folded cable length which forms part of the locking device.
Figure 1B:
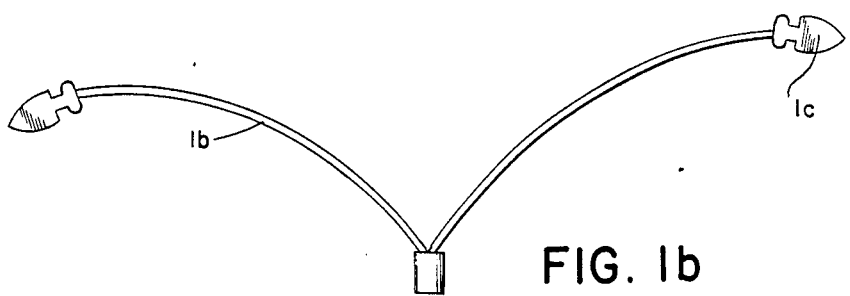
Figure 1C:
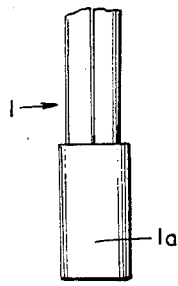
Figure 1C:
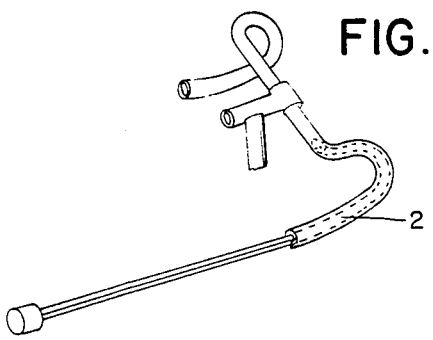

In referring to the drawings, it can be seen from FIG. 1 that the cable 1 is composed of two equal lengths of steel alloy cables swaged together at one end (1a) to form a folded length of cable (1b).

Affixed to each of the spread apart cable ends are identical halves (1c) of a missile shape or phallic head plug (1d). When folded together cable 1 is permitted to be slid either in storageable arrangement inside tubular chamber handlebar 2 in a non-key removable manner, or phallic head plug (1d) is permitted to be inserted in key removable locking engagement in the inner body of the lock, as shown in the locking mechanism of FIG. 6.

Figure 2:
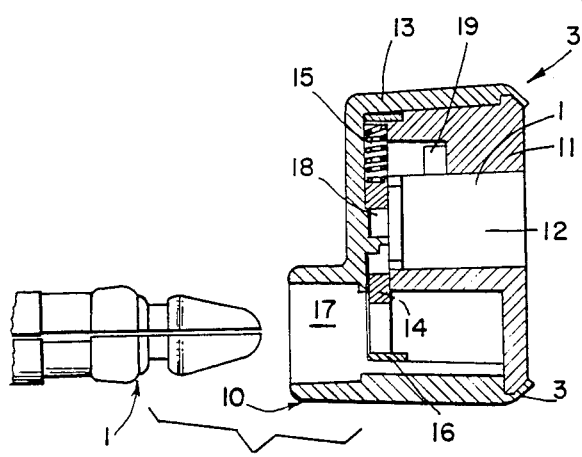
FIG. 2 is a cross sectional view of the lock and its internal mechanisms.

FIG. 2 depicts locking mechanism (10), comprised of inner body (11), which accommodates lock plug cylinder (12). The outer housing (13) of said locking mechanism receives sliding latch plate (14), which is held down, biased or tensioned by spring (15). Sliding latch plate (14) and spring (15) are protected or safe guarded against potential drilling or cut-through by insert plate (16), which is made of a hardened steel alloy. When outer housing (13) receives inner body (11) and the two pieces are fastened together by well known or conventional means, the lock is formed. An opening (17), in the lock receives cable end plug (1d), which then engages the sliding latch plate in the arc (a) formed by radius 30a of FIG. 5 and forces it upwardly out of the way in a direction opposing spring (15). After cable end plug (1d) is inserted enough to pass a portion of the diameter of the phallic head into arc (a) and raise sliding latch plate (14), the encircled groove of lesser diameter of the end plug becomes aligned with the portion of the circle formed by arc (b) of the sliding latch plate when spring (15) abruptly becomes unopposed. The two halves comprising the cable end plug (1d) are then secured inside of the lock, as shown in FIG. 6.

In order to release cable end plug (1d) from the lock, sliding latch plate (14) from the groove in the cable end plug. This is accomplished by inserting a key into lock plug cylinder (12) in a direction opposite from and above the direction in which the cable end plug is inserted. When the inserted key (not shown) is turned, cam (18) lifts sliding latch plate (14) away from the groove and in the direction opposing spring (15). The end plug is then free, and can be removed from the lock. The outer cylinder part of lock plug cylinder (12) is prohibited from turning freely by retaining pin (19), which allows the plug portion of (12) to turn independent of the cylinder portion, thereby allowing cam (18) to rotate.

Retaining pin (19) also prohibits lock plug cylinder (12) from being removed from inner body (11) after the lock components are assembled and fastened together. When the cable end plug is removed from the lock opening and the key inserted into lock plug cylinder (12) is no longer being rotated in a direction opposing spring (15), spring (15) is unopposed and sliding latch plate (14) and cam (18) are returned to their positions of rest.

Figure 3:
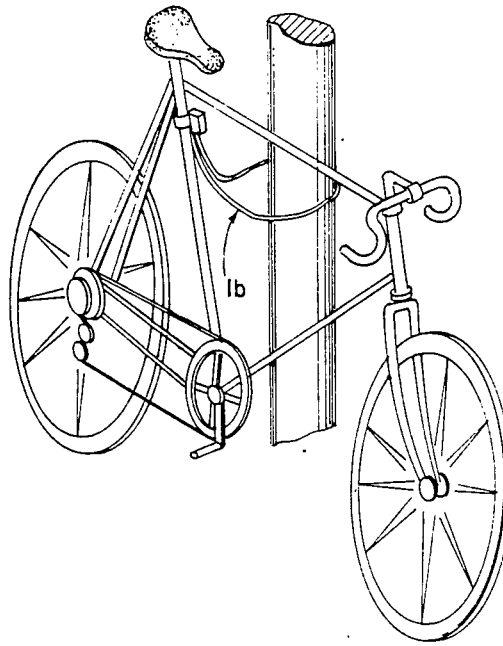
FIG. 3 is a perspective view showing a bicycle locked to a stationary structure, and an enlarged view in perspective of the lock attached to a portion of the bicycle frame.
Figure 4:
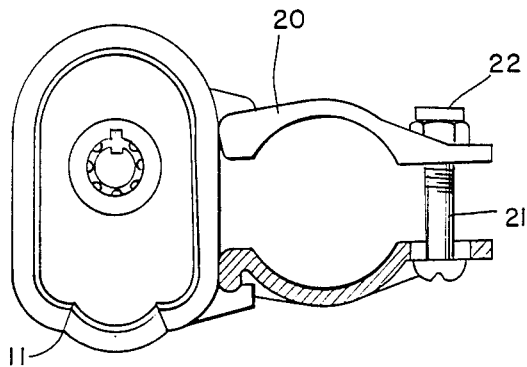
FIG. 4 is a view taken along line 3—3 of FIG. 2; wherein the lock is attached to clamps fastened by means of a bolt and nut to part of the frame (not shown) of a bicycle.

FIG. 3 depicts a bicycle secured to a stationary structure after the cable (16) in the spread apart position has been passed around the structure, and folded into a length of cable to align the two identical halves of the plug, which is locked by insertion into the lock, which is attached to the bicycle frame by the clamps (20), which are fastened together by means of bolt (21) and nut (22), as shown in FIG. 4.

Figure 5:
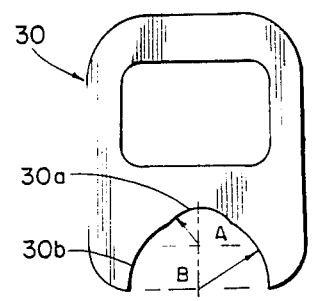
FIG. 5 is an enlarged isolated view in perspective of the sliding latch plate taken along line 4—4 of FIG. 2.
Figure 6:
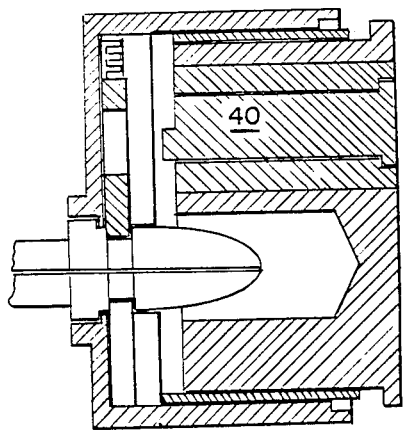
FIG. 6 is a cross sectional view of the lock and its internal mechanisms with the two-part head portion of the folded cable locked into the inner body of the lock portion of the cable vehicle locking device.

The sliding latch plate component of the lock is shown in FIG. 5. In the operation of the cable locking device, the dual radii portions (30a) and (30b) of the lower semi-circular open portion of the latch plate (30) are of particular importance. The shape of dual radius portions (30a) and (30b) allow cable head plug (1d) to push the sliding latch out of the way in an upwardly direction against spring (15). The radius (30a) of arc (a) is formed from center point A, whereas the radius (30b) of arc (b) is formed from center point B. A circle formed from the center point B is approximately 40% larger than a circle formed from the radius from point A that inscribes arc (a). Putting it another way. the radius from a midpoint which forms the semi-circle is less than the radius from the same point that forms the arc. When the cable end plug is inserted to pass a portion of the diameter of the head into arc (a) of the semi-circular opening and raise the sliding latch plate, the encircled groove of lesser diameter of the end plug becomes aligned with the portion of the circle formed by arc (b) of the sliding latch plate, thereby allowing quick locking to take place as shown in FIG. 6 without the aid of an auxiliary, such as a key.

In order to release cable head plug (1d) from the locked position shown in FIG. 6, a key is required. The key (not shown) is inserted into the opening of the lock plug rototable cylinder (40) from a direction opposite from the direction in which the head plug is inserted and rotated until the cam affixed thereto lifts the sliding latch plate from the groove in a direction opposing the spring.

While the non-key locking cable device for vehicles has been described by reference to particular embodiments, it is to be understood that many variations can be made in the invention device, without departing from the invention scope.

What is claimed is:

1. A cable-lock device for tubular frame vehicles, wherein the cable member is storeable in a hollow frame of the vehicle and is removable without a key from said hollow and capable after insertion into a lock member affixed to said vehicle of locking said vehicle without a key to a stationary structure comprising:
    two equal lengths of cables swaged together at one end and having identical halves of a phallic head plug with grooves therein at another end; and
    a locking mechanism comprising a sliding latch plate biased in a rest position by a spring, said latch plate having in its lower part of semi-circular opening with an arc at the midpoint of the semi-circle into which said phallic head is inserted to push the latch plate upwardly against said spring until the groove in said phallic head plug is aligned with the semi-circle, said mechanism having a lock plug rotatable cylinder at the opposite end and above said semi-circular opening to release said plug upon rotation of a key inserted in an opening of said lock plug rotatable cylinder.

2. The cable-lock device of claim 1, wherein said spring and said sliding latch plate are protected from cut-through by an insert protective plate.

3. The cable-lock device of claim 1, wherein a retaining pin member prohibits an outer cylinder part of said lock plug cylinder from turning freely, and allows the plug portion to turn independently of the cylinder portion, thereby allowing a cam to rotate.

4. The cable-lock device of claim 1, wherein a retaining pin member prohibits said lock plug cylinder from being removed from an inner body of said lock after said lock components are assembled and fastened.

5. The cable-lock device of claim 1, wherein a cam is affixed to said lock plug rotatable cylinder to lift said sliding latch plate from said groove in a direction opposing said spring.

6. The cable-lock device of claim 1, wherein the said swaged end of said cables from a part of a vehicle handlebar when said cables are folded and said phallic head is inserted into a hollow handlebar member.

* * * * *